INVENTOR.
CHARLES L. D'OOGE
BY
ATTORNEYS

May 28, 1957 C. L. D'OOGE 2,793,824
RELEASE MECHANISM FOR DROPPING LOADS FROM BALLOONS
Filed April 16, 1954 2 Sheets-Sheet 2

INVENTOR.
CHARLES L. D'OOGE
BY
ATTORNEYS

United States Patent Office 2,793,824
Patented May 28, 1957

2,793,824

RELEASE MECHANISM FOR DROPPING LOADS FROM BALLOONS

Charles L. D'Ooge, China Lake, Calif., assignor to the United States of America as represented by the Secretary of the Navy Application April 16, 1954, Serial No. 423,864

4 Claims. (Cl. 244—32)

(Granted under Title 35, U. S. Code (1952), sec. 266)

The invention described herein may be manufactured and used by or for the Government of the United States of America for governmental purposes without the payment of any royalties thereon or therefor.

This invention relates to meteorology and more particularly to apparatus for releasing a balloon raised load at a desired altitude of ascension.

In obtaining data concerning the characteristics of the atmosphere it is common practice to employ balloons for raising equipment in the atmosphere, such as temperature, pressure and humidity recording apparatus, radiosondes which radio the data, air sampling bottles, etc., recovery of which is desired. It is apparent, therefore, that the expendable parts of the equipment, such as balloons and any devices which release a load for descent should be constructed as inexpensively as possible.

The principal object of this invention is to provide an inexpensive release device by which a balloon raised load may be released for descent and recovery.

Further objects, advantages and salient features will become more apparent from the description to follow, the appended claims, and the accompanying drawing, in which:

Figures 1, 2:
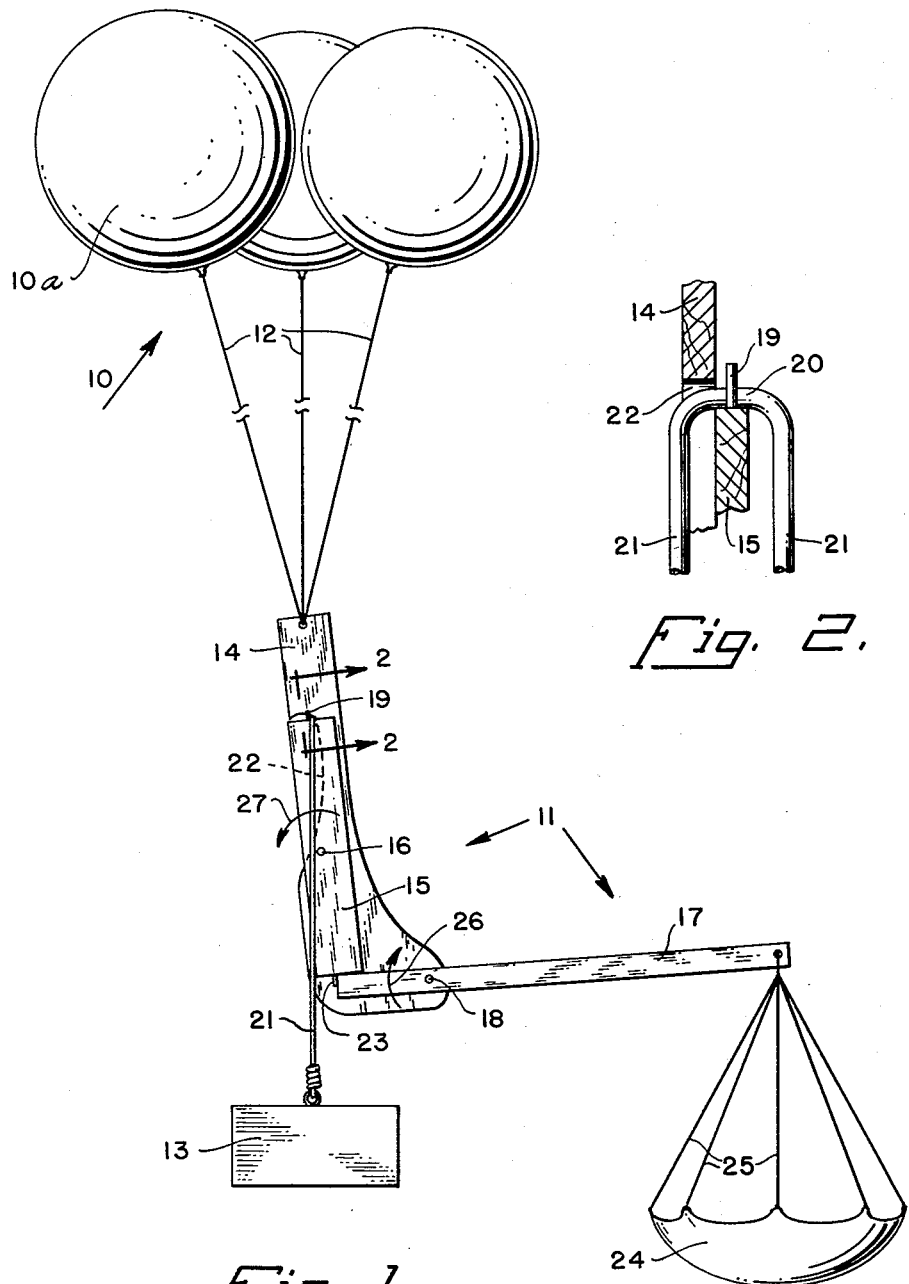
Fig. 1 is an elevation of the invention during ascent in the atmosphere.
Fig. 2 is an enlarged detail taken on line 2—2, Fig. 1.

Referring to the drawing, the subject of the invention comprises, in general, a cluster of balloons 10, connected to a release mechanism 11 by cords 12, and a load 13 adapted to be released by the release mechanism when the assembly, as shown in Fig. 1, ascends to the desired altitude.

The release mechanism comprises a frame member 14 to which is pivotally connected a first lever 15, by a pivot pin 16, and a second lever 17 by a pivot pin 18. As shown in Figs. 1 and 2, the upper end of lever 15 is provided with a projecting pin 19 against which the bight 20 of a bail 21 abuts, the bight being disposed within a notch or cut-out portion 22 in one edge of frame member 14. The lower end of lever 15 is provided with a similar projecting pin 23 which abuts the left end of lever 17. A parachute 24 is connected to the right end of lever 17 by shroud lines 25.

Figure 1A:
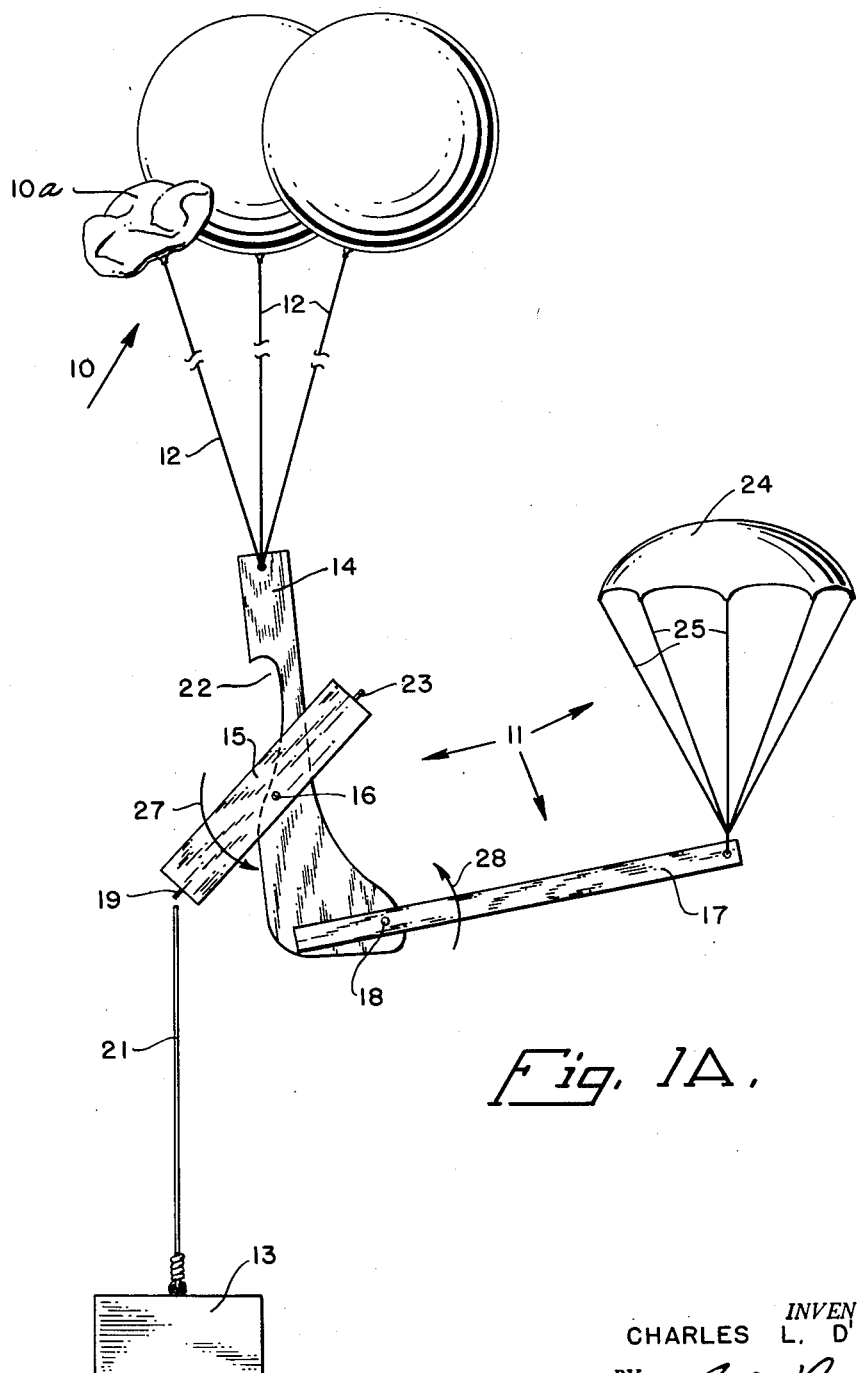
Fig. 1A is a similar elevation at a desired height of ascent when a load is released for fall to the earth.

In the operation of the invention, one of the balloons, such as balloon 10a, is inflated more than the others so that it will burst at a substantially predetermined or desired altitude due to the decreased ambient air pressure thereat. The apparatus is released for ascent, as shown in Fig. 1, wherein the parachute hangs from lever 17. The load 13 applies a force on lever 15 through the bail to the left side of pivot 16, tending to rotate lever 15 in the direction of arrow 27. Lever 15 is prevented from rotating, however, since the weight of lever 17 and drag of the parachute tend to rotate lever 17 in the direction of arrow 26, maintaining pin 23 in abutting relation with the left end of lever 17. When the assembly reaches the predetermined altitude one of the balloons bursts, as shown in Fig. 1A, which renders the assembly negatively buoyant which results in its temporary descent. As it descends the parachute moves to the position shown in Fig. 1A and its drag rotates lever 17 in the direction of arrow 28 releasing its left end from abutting relation with pin 23. Due to the eccentric force on lever 15, previously referred to, this lever now rotates in the direction of arrow 27 and when the lever reaches a certain position, the bail slides along pin 19 and off of its outer free end for fall with the load to the surface of the earth. The load may be provided with a parachute (not shown) to check its velocity of fall if desired, this being conventional and well known in the art.

The release mechanism may be constructed of wood, scrap or otherwise, and nails or wood screws may be employed for the pins and pivots. It will be apparent, accordingly, that the release mechanism can be constructed at a minimum of cost, thus rendering it admirably suitable as expendible apparatus.

Obviously many modifications and variations of the present invention are possible in the light of the above teachings. It is therefore to be understood that within the scope of the appended claims the invention may be practiced otherwise than as specifically described.

What is claimed is:

1. Apparatus comprising; a plurality of balloons including an over inflated balloon adapted to burst at a desired altitude, a load, and a load release device secured to and disposed below the balloons for releasably connecting the load to said device, said device including a parachute secured thereto, and means carried by the device and actuated by the parachute during ascent of the apparatus for retaining the load connected to said device, said means also being actuated by the parachute, in response to temporary descent of the apparatus after said over inflated balloon bursts, to effect release of said load from said device and said balloons.

2. Apparatus in accordance with claim 1 wherein said device includes a frame member suspended by the balloons, a first upwardly extending lever pivotally connected intermediate its ends to the frame member, a second lever extending in a generally transverse direction to the first lever pivotally connected intermediate its ends to the frame member, the load being carried by the upper end of the first lever and tending to rotate the first lever to a position to permit the load to disengage therefrom, the second lever having one end in abutting relation to the lower end of the first lever and preventing the first lever from rotating when the apparatus ascends, the second lever having the parachute connected to and depending from its other end, the parachute adapted to move relative to the second lever to a position above said other end when the apparatus descends, whereby the drag of the parachute rotates the second lever to a position wherein its first named end is out of abutting relationship with the lower end of the first lever, thereby permitting the first lever to rotate and release the load therefrom.

3. Balloon apparatus, comprising; a load, a load release device including a frame member adapted to be suspended by a plurality of balloons one of which is adapted to burst at a desired altitude, a first upwardly extending lever pivotally connected intermediate its ends to the frame member, a second lever extending in a generally transverse direction to the first lever pivotally connected intermediate its ends to the frame member, the load being releasably carried by the upper end of the first lever and tending to rotate the first lever to a position to permit the load to release therefrom, the second lever having one end in abutting relation to the lower end of the first lever and preventing the first lever from rotating when the apparatus ascends, the second lever having a parachute connected to and depending from its other end, the parachute adapted to move relative to the second lever to a position above said other end when the apparatus descends, whereby the drag of the parachute rotates the second lever to a position wherein its first named end is out of abutting engagement with the lower end of the first lever, thereby permitting the first lever to rotate and release the load therefrom.

4. Apparatus comprising; a balloon, a load adapted to be raised by the balloon, a device secured to the balloon releasably supporting said load, and means carried by the device for maintaining the load secured to the device while the balloon, the device and load are ascending, said means including a parachute adapted to effect release of the load from the device and balloon when the balloon, device and load descend.

References Cited in the file of this patent

UNITED STATES PATENTS

| | | |
|---|---|---|
| 28,623 | Williams | June 5, 1860 |
| 502,487 | Drake | Aug. 1, 1893 |
| 557,475 | Blanding | Mar. 31, 1896 |
| 1,090,867 | Longshore | Mar. 24, 1914 |
| 1,784,954 | Alvistur | Dec. 16, 1930 |
| 2,345,550 | Berman | Apr. 4, 1944 |
| 2,416,568 | Blenden | Feb. 25, 1947 |
| 2,444,642 | Frieder et al. | July 6, 1948 |
| 2,628,307 | Lloyd et al. | Feb. 10, 1953 |